US 12,235,988 B2

(12) United States Patent
Eberlein et al.

(10) Patent No.: US 12,235,988 B2
(45) Date of Patent: *Feb. 25, 2025

(54) DERIVING AND AUGMENTING ACCESS CONTROL FOR DATA LAKES

(71) Applicant: SAP SE, Walldorf (DE)

(72) Inventors: Peter Eberlein, Malsch (DE); Volker Driesen, Heidelberg (DE)

(73) Assignee: SAP SE, Walldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/209,714

(22) Filed: Jun. 14, 2023

(65) Prior Publication Data

US 2023/0394167 A1    Dec. 7, 2023

Related U.S. Application Data

(63) Continuation of application No. 16/566,321, filed on Sep. 10, 2019, now Pat. No. 11,704,430.

(51) Int. Cl.
*G06F 21/62* (2013.01)
*G06F 16/11* (2019.01)
*G06F 16/13* (2019.01)

(52) U.S. Cl.
CPC ........ *G06F 21/6236* (2013.01); *G06F 16/125* (2019.01); *G06F 16/13* (2019.01); *G06F 2221/2141* (2013.01)

(58) Field of Classification Search
CPC ........... G06F 21/62–629; G06F 16/125; G06F 16/13; G06F 2221/2141
See application file for complete search history.

(56) References Cited

U.S. PATENT DOCUMENTS

| 5,724,578 | A | 3/1998 | Morinaga et al. |
|---|---|---|---|
| 6,044,378 | A * | 3/2000 | Gladney ................. G06F 16/94 |
| 8,655,914 | B2 | 2/2014 | Prahlad et al. |
| 9,460,300 | B1 | 10/2016 | Kissner et al. |
| 9,836,501 | B2 | 12/2017 | Robichaud et al. |
| 10,891,552 | B1 | 1/2021 | Saurabh et al. |
| 2008/0091747 | A1* | 4/2008 | Prahlad ............... G06F 21/6218 |
| 2008/0222108 | A1* | 9/2008 | Prahlad .................. G06Q 10/10 |
| | | | 707/E17.084 |
| 2017/0091279 | A1 | 3/2017 | Shah et al. |
| 2017/0255790 | A1 | 9/2017 | Barrett et al. |
| 2018/0314705 | A1 | 11/2018 | Griffith et al. |

(Continued)

OTHER PUBLICATIONS

"U.S. Appl. No. 16/566,321, Examiner Interview Summary mailed May 23, 2022", 2 pgs.

(Continued)

*Primary Examiner* — Madhuri R Herzog
(74) *Attorney, Agent, or Firm* — SCHWEGMAN LUNDBERG & WOESSNER, P.A.

(57) ABSTRACT

In an example embodiment, access to a data set in a data lake can be specified using several approaches, based on the metadata and information attached. The metadata may be replicated from the original data source of the underlying data, and additional metadata may be modeled and stored to construct linkage information between data types. This linkage information may be used to automatically grant access to users to additional objects that are linked to objects that the user has explicit access to.

20 Claims, 10 Drawing Sheets

(56) References Cited

U.S. PATENT DOCUMENTS

2020/0250235 A1 8/2020 Abhyankar et al.
2021/0073411 A1 3/2021 Eberlein et al.

OTHER PUBLICATIONS

"U.S. Appl. No. 16/566,321, Examiner Interview Summary mailed Oct. 26, 2022", 3 pgs.
"U.S. Appl. No. 16/566,321, Examiner Interview Summary mailed Dec. 10, 2021", 2 pgs.
"U.S. Appl. No. 16/566,321, Final Office Action mailed Apr. 15, 2022", 16 pgs.
"U.S. Appl. No. 16/566,321, Non Final Office Action mailed Sep. 22, 2022", 21 pgs.
"U.S. Appl. No. 16/566,321, Non Final Office Action mailed Nov. 9, 2021", 17 pgs.
"U.S. Appl. No. 16/566,321, Notice of Allowance mailed Mar. 6, 2023", 11 pgs.
"U.S. Appl. No. 16/566,321, Response filed Feb. 8, 2022 to Non Final Office Action mailed Nov. 9, 2021", 9 pgs.
"U.S. Appl. No. 16/566,321, Response filed May 27, 2022 to Final Office Action mailed Apr. 15, 2022", 10 pgs.
"U.S. Appl. No. 16/566,321, Response filed Dec. 16, 2022 to Non Final Office Action mailed Sep. 22, 2022", 12 pgs.
"Data lineage", Wikipedia, [Online]. Retrieved from the Internet: <URL: https://en.wikipedia.org/wiki/Data_lineage#Prescriptive_data_lineage>, (Jun. 22, 2021), 14 pgs.
Villata, Serena, et al., "Access Control Model for Linked Data", OTM Workshops, [Online]. Retrieved from the Internet: <URL: https://www.researchgate.net/publication/220830576_An_Access_Control_Model_for_Linked_Data>, (Oct. 2011), 454-463.

\* cited by examiner

DERIVING AND AUGMENTING ACCESS CONTROL FOR DATA LAKES

CROSS-REFERENCE TO RELATED APPLICATIONS

This application is a continuation of prior U.S. application Ser. No. 16/566,321, filed on Sep. 10, 2019, which is incorporated by reference herein in its entirety.

TECHNICAL FIELD

This document generally relates to systems and methods for use in data lakes. More specifically, this document relates to deriving and augmenting access control for data lakes.

BACKGROUND

A data lake is a storage repository that holds vast amounts of raw data in its native format until it is needed. It commonly stores data using a flat architecture. When the need arises, the data lake can be queried for relevant data. Each data element in the lake is assigned a unique identifier and tagged with a set of extended metadata tags, which allow for the queries to be processed effectively.

Data lakes are in contrast to data warehouses, which used a structured database, such as a relational database, to store data. This allows the data to be stored in an extremely organized manner, but they have issues with storing uncurated data originating from multiple sources. Data lakes are, therefore, often a better choice when the data being stored is uncurated and may originate from sources outside of a company's operational systems.

One example use of a data lake is to store data from different domains, such as a landscape directory data, monitoring data of a network, operating system data, database data, application server data, application data, lifecycle procedure logs/statistics, problem tickets, application usage statistics, financial information of an impact of an outage to revenue, and so forth. Some of these pieces of data are not confidential, but others have various levels of confidentiality where access needs to be controlled in a fine-grained fashion (e.g., customer data, financial data, credentials, etc.).

A technical problem exists, however, in modeling, defining, and instantiating access control for different data sets and different data consumers in a data lake. Traditional access control, such as the use of access control lists, require significant effort to design and maintain. Specifically, since data lakes contain data sets replicated from a lot of different data sources, even data domains, it is difficult to scale (Access Control Lists) ACLs to the number of different pieces of data in a data lake. Furthermore, data lakes are often used by data consumers, such as data scientists and analysts, that require broad access to data, but not necessarily all the data. For example, an Information Technology (IT) expert at a Software-as-a-Service (SaaS) operation may receive a trouble ticket from a user describing a technical issue with some software. That IT expert may then need to see that particular user's data and related data, but only for a limited time while analyzing the problem, and without necessarily seeing other user's data.

BRIEF DESCRIPTION OF DRAWINGS

The present disclosure is illustrated by way of example and not limitation in the figures of the accompanying drawings, in which like references indicate similar elements.

DETAILED DESCRIPTION

Figure 1:
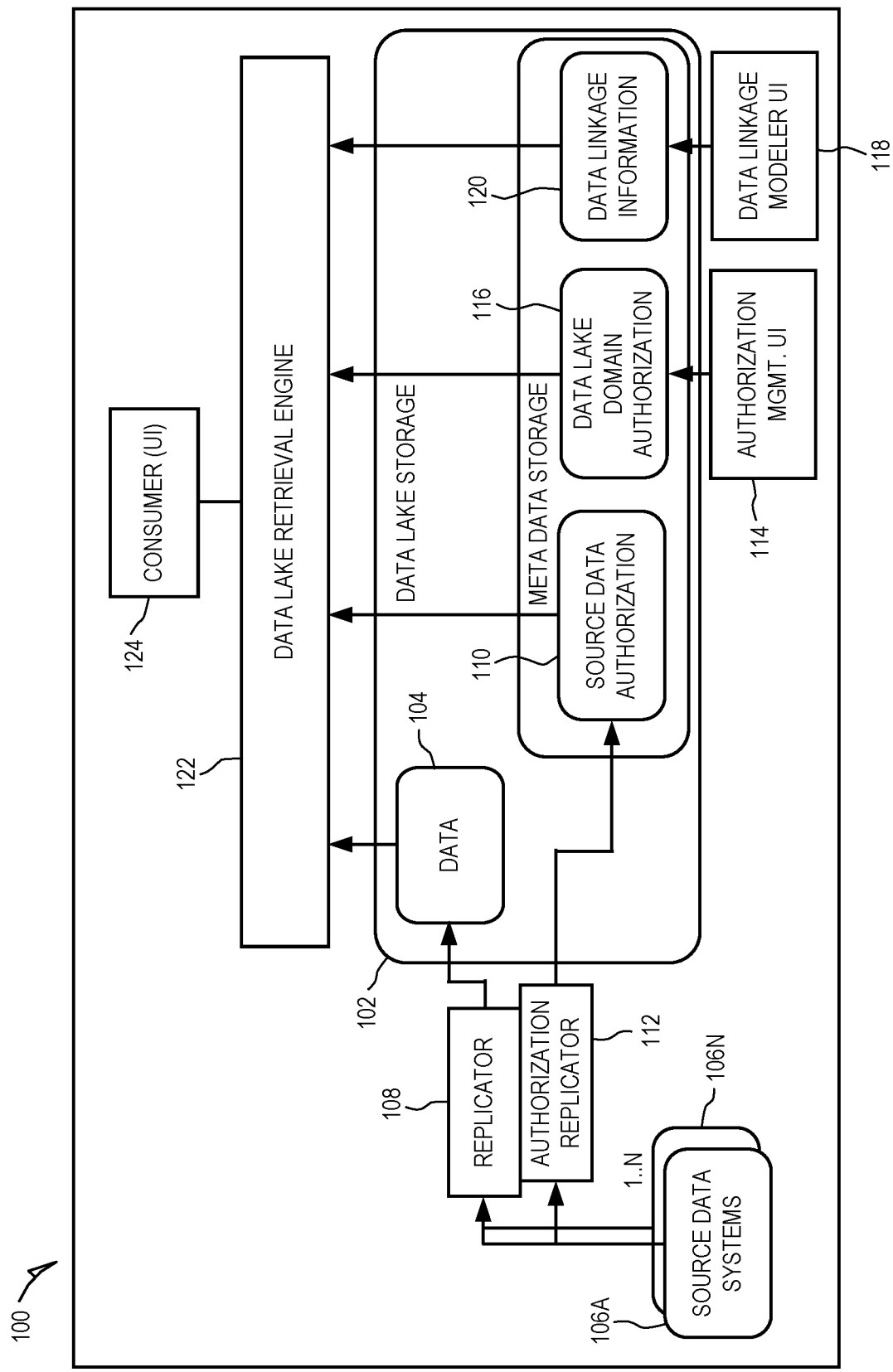
FIG. 1 is a block diagram illustrating a data lake authorization management system, in accordance with an example embodiment.

The description that follows discusses illustrative systems, methods, techniques, instruction sequences, and computing machine program products. In the following description, for purposes of explanation, numerous specific details are set forth in order to provide an understanding of various example embodiments of the present subject matter. It will be evident, however, to those skilled in the art, that various example embodiments of the present subject matter may be practiced without these specific details.

In an example embodiment, data is enriched upon replication to a data lake. Data linkage is then modeled to derive new access models from this information.

In particular, in an example embodiment, data is enriched using data domain information. For a relational database management system (RDBMS), for example, this data domain information may include data such as table name and the semantic meaning of the data (e.g., "consumer home address," "host CPU monitoring," "customer usage statistics"). Then the data is enriched by additional attributes describing the set of records, such as information on the data origin (e.g., "IT landscape," "system identifier," "tenant identifier"). Finally, if access information was defined at the data's origin, any access control information and associated user identifications (IDs) are replicated so that the access permission of a certain user to a certain data record can be reconstructed. If the data set was not defined with access control at the item level, this may be specified as well. For example, for monitoring data, administrators will likely have access to full data sets of a single origin, such as a host or landscape, or not at all.

At that point, for the data domains in the data lake, a data linkage model, such as an ontology, can be defined. The linkage relates to a data field, which allows definition of a foreign key relationship: domain A is linked to domain B, entry A1 is related to B2 because they have the same field value, and so forth. These links can be further annotated (with, for example, range information regarding a second data field like a date/time field). A data domain indicates what the data describes (operating system monitoring, procedure logs, usage statistics, etc.)

Access to a data set in a data lake can be specified using several approaches, based on the metadata and information attached. In a first example approach, access to a data set is based on access to the original data record. Specifically, if a user had access to a certain data record in the system from which the data was replicated, access can be granted to this record in the data lake as well. Access may additionally be granted to data records in lined data domains, where the defined foreign key relationship is fulfilled. Since this can grant access to a very large set of domains, in an example embodiment, the access can be granted selectively by specifying the domains (and potentially origins) where access is allowed. This gives the data consumer access not only to the individual record but also to related information. This can thus be used to grant access to a data consumer and add the context information.

In a second example approach, access is based on a single record and related records. This approach can be used even if the user did not have access to any record. One record is identified to which access should be granted to the user, and then access is granted for the user to a set of data domains, with the user gaining access to all linked data records within the granted data domains. This can be used to grant access to a linked set of records and is useful in, for example, troubleshooting analysis situations.

In a third example approach, access is based on ranges of records in data domains. These ranges can be values of any field of the records. Examples include time ranges, regions, company codes, and so forth. The domain linkage is also used to grant access to ranges of records in linked domains. This approach is useful to grant access to, for example, data scientists.

FIG. 1 is a block diagram illustrating a data lake authorization management system 100, in accordance with an example embodiment. Data lake storage 102 stores data 104 that has been replicated from one or more source data systems 106A, 106N. This replication may be performed by a replicator 108. The replicator 108, may, in addition to replicating the data 104 itself, annotate the data 104 with metadata regarding the origin of the data 104 (e.g., landscape, system, tenant, etc.). In addition to storing the data 104, the data lake storage 102 contains a specialized metadata storage. This metadata storage stores source data authorization data 110 that has been replicated from the one or more source data systems 106A, 106N. This replication of the source data authorization data may be performed by an authorization replicator 112.

Additionally, an authorization management component 114 reads, writes, and updates authorization metadata for combinations of data sets and users and combinations of data domains and users. These combinations may collectively be known as data lake domain authorization data 116. The authorization management component 114 may have a corresponding authorization management graphical user interface (GUI), which allows for user input to aid in retrieving and updating the metadata information.

Furthermore, a data linkage management modeler 118 models relations between data domains. This may be known as data linkage information 120. Some of the data linkage information 120 may be obtained from database tables in the one or more source data systems 106A, 106B. For example, when database tables are replicated to the lake, foreign key relations are known via technology that models these links, such as Data Dictionary in ABAP and Core Data Services in HANA. Other linkages may be modeled in the data lake itself, by combining data from various sources to reach data that was previously unavailable because it was separated into different silos in the various source systems. Specifically, relations can be annotated regarding the fields in the data domains specifying a foreign key relationship between data sets in the data domains. The data linkage management modeler 118 may have a corresponding data linkage modeler GUI, which allows for user input for reading, writing, and updating data linkage information.

A data lake retrieval engine 122 is then designed to obtain a request to retrieve data from a data consumer 124, identify the data set to retrieve from data 104, identify if the data set has read authorization granted to the user by examining the source data authorization data 110 and data lake domain authorization data 116, and identify if the data set is related (via one or more hops) to a data set to which the data consumer 124 has read authorization. If, though this analysis, it is determined that the data consumer has read authorization, then the data set is provided to the data consumer 124. If not, the data consumer 124 is alerted that access has been denied.

Figure 2:
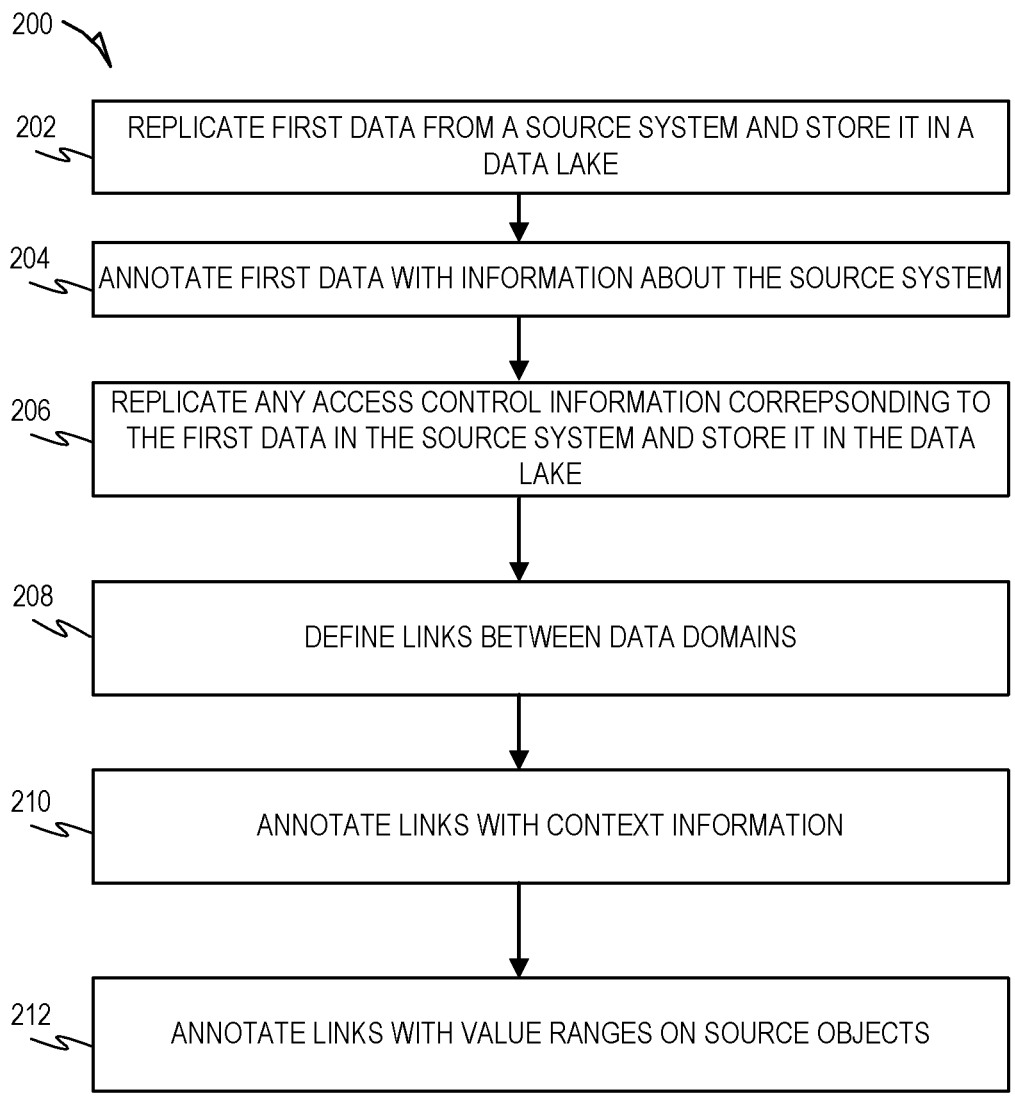
FIG. 2 is a flow diagram illustrating a method, in accordance with an example embodiment, of data intake by a data lake authorization management system.

FIG. 2 is a flow diagram illustrating a method 200, in accordance with an example embodiment, of intaking data by a data lake authorization management system 100. At operation 202, first data is replicated from a source system and stored by the data lake authorization management system 100 in a data lake. At operation 204, the first data is annotated with information about the source system. This information about the source system may include domain information. At operation 206, any access control information corresponding to the first data in the source system is replicated and stored by the data lake authorization management system 100 in the data lake. It should be noted that the replication performed in operation 202 may, in some example embodiments, be performed in the same operation as the replication performed in operation 206.

At operation 208, links between data domains are defined. At operation 210, these links are annotated with context information. Context information describes the state of the data consumer system when access is requested. For example, the context information may be an entry point to linked data, which would allow, for example, an entry point of contract granting more access than an entry point of procedure, even if both navigate through a third domain-like system such as billing). These annotations can be made on any link level.

Thereafter, at operation 212, the links are annotated with value ranges on source objects. As will be seen, armed with all of the data, metadata, and linkage information (with annotations), the data lake authorization management system 100 may determine whether a particular user is able to access a particular piece of data at runtime.

Figure 3:
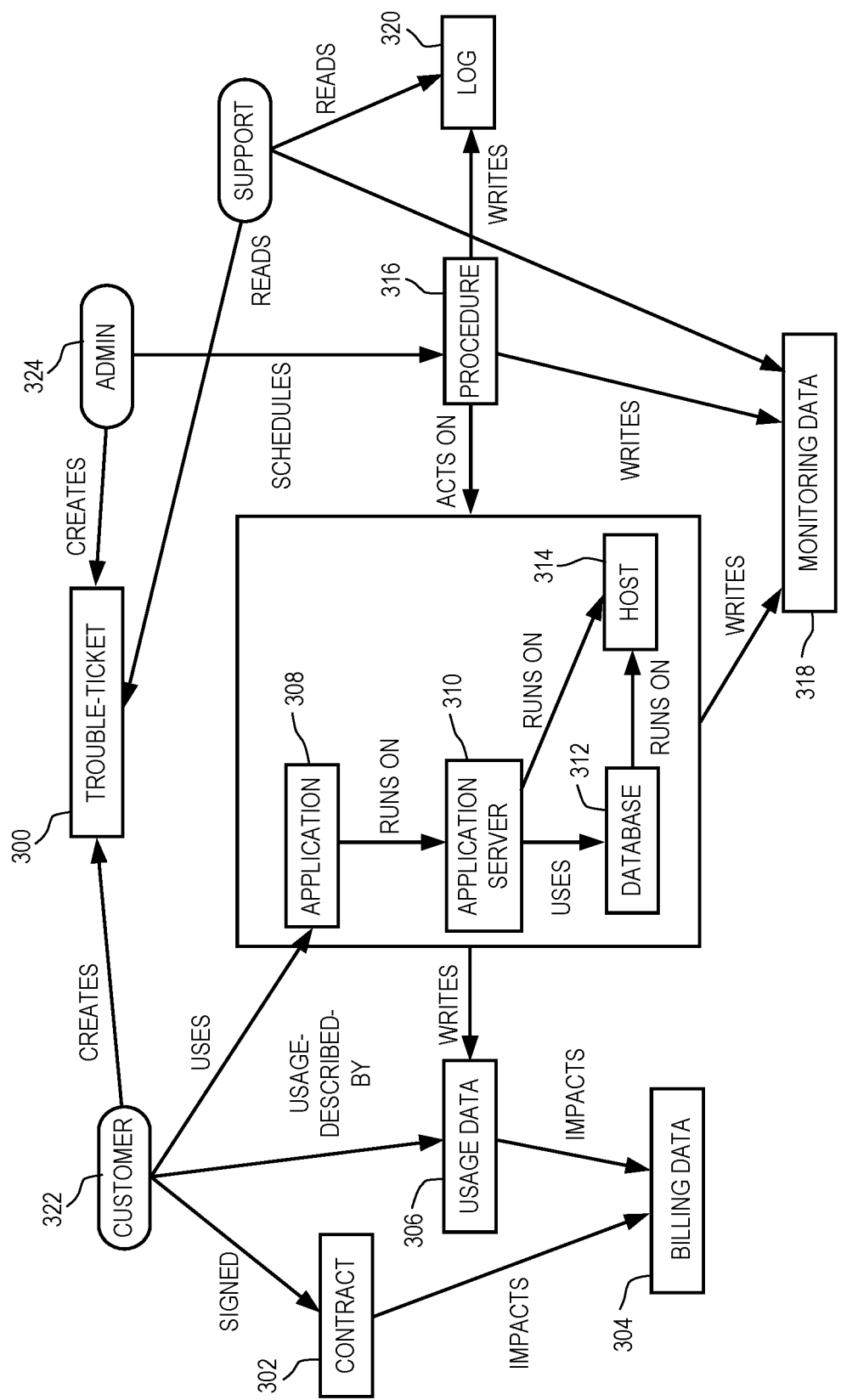
FIG. 3 is a diagram illustrating data linkage information modeled by a data linkage management modeler, in accordance with an example embodiment.

FIG. 3 is a diagram illustrating data linkage information 120 modeled by a data linkage management modeler 118, in accordance with an example embodiment. Here, various objects 300, 302, 304, 306, 308, 310, 312, 314, 316, 318, 320 are linked to one another based on information obtained by a source providing the data. For example, contract 302 that a customer 322 may sign impacts billing data 304, as does usage data 306 written when the customer 322 uses an application 308. A trouble ticket 300 may not be linked directly to any of the other objects 302, 304, 306, 308, 310, 312, 314, 316, 318, 320, but may be created by either a customer 322 or an administrator 324, and read by a support member 326. The administrator 324 may schedule a procedure 316 that may act upon the application 308, and both the procedure 316 and the application 308 may write monitoring data 318. As will be seen later, this linkage information 120 will be used in conjunction with authorization information to determine whether a particular user has access to a particular piece of data based upon another piece of data that the user has access to.

Figure 4:
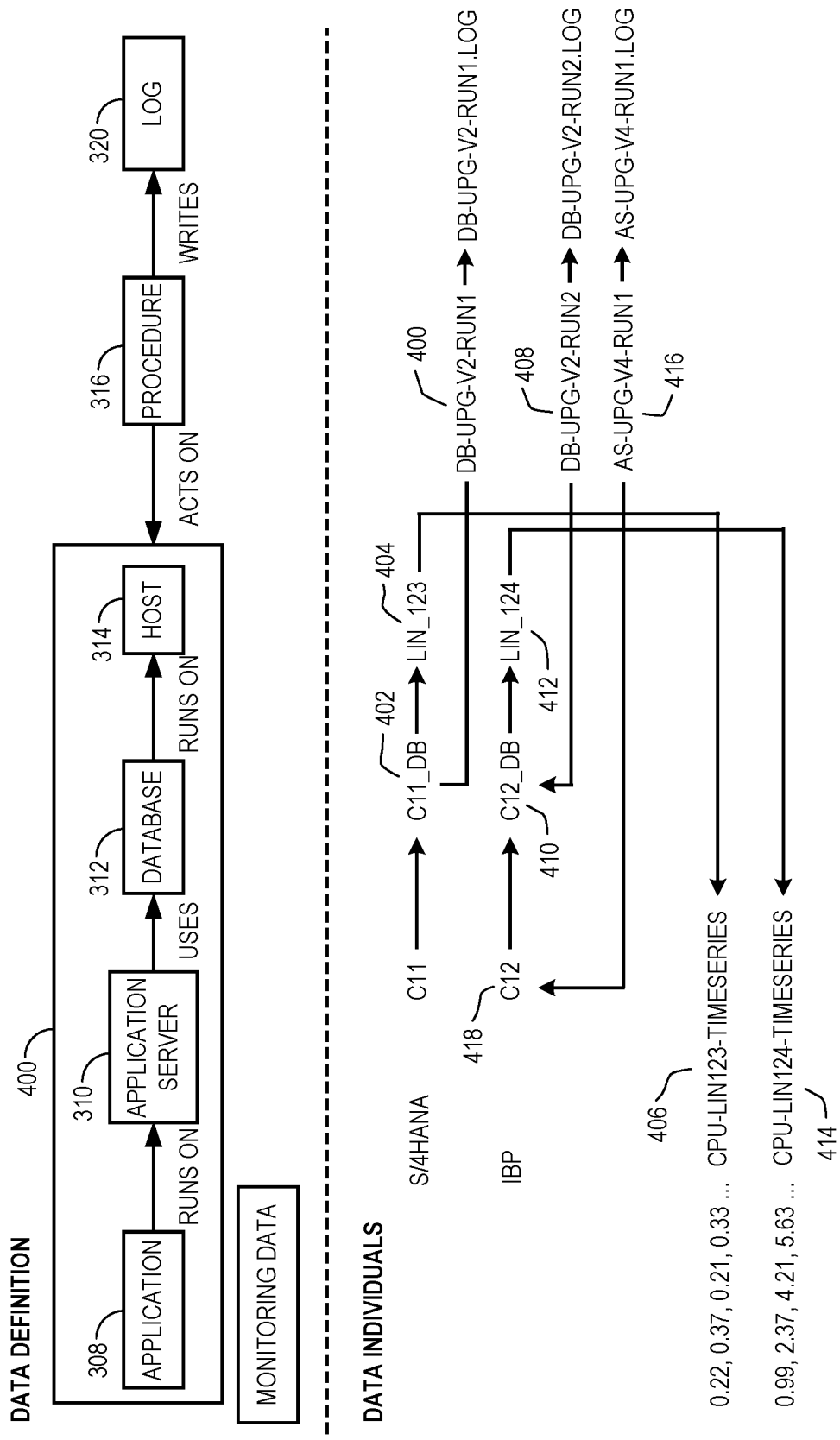
FIGS. 4 and 5 are diagrams illustrating the derivation of access to objects based on a data definition, in accordance with an example embodiment.
Figure 5:
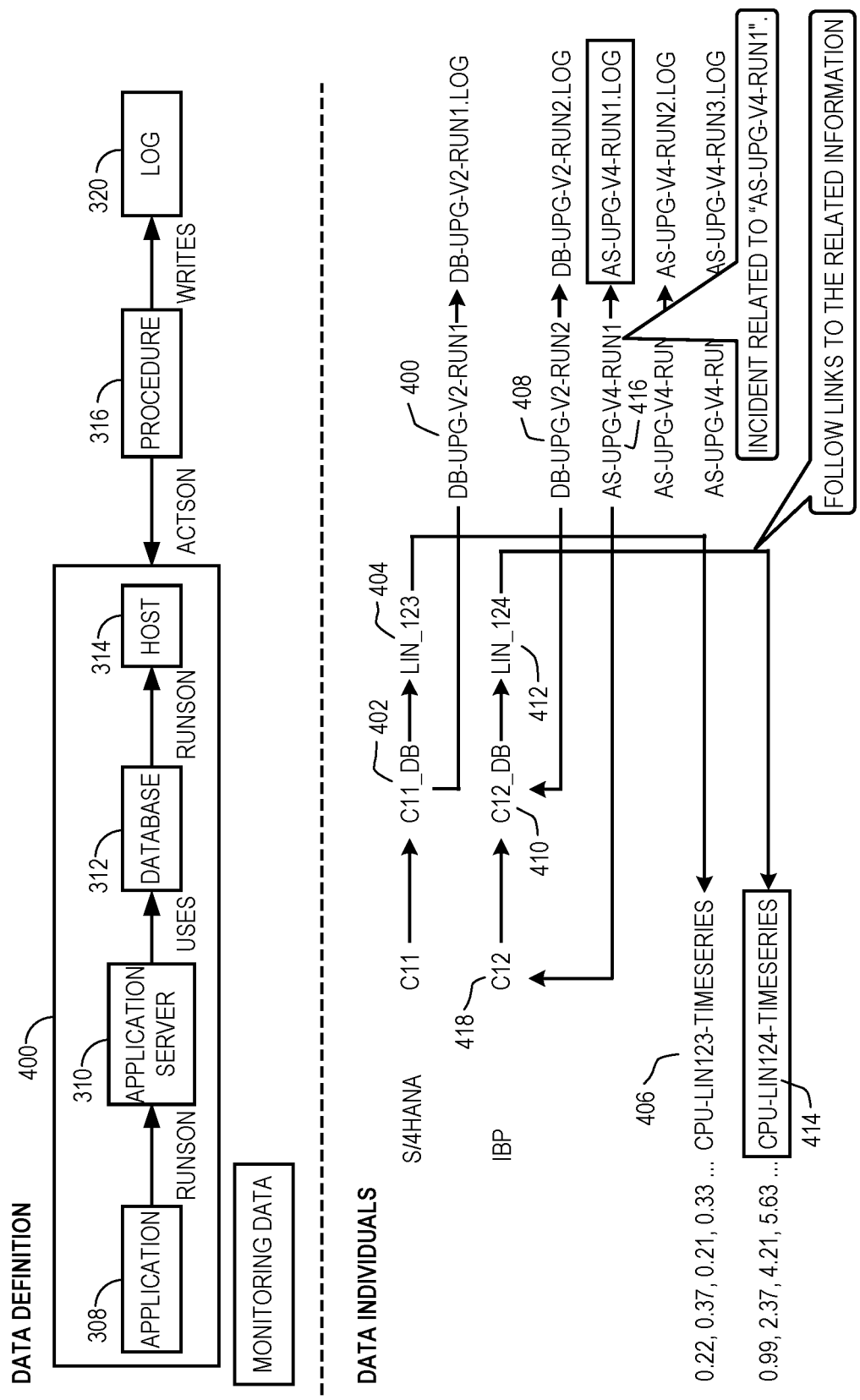

FIGS. 4 and 5 are diagrams illustrating the derivation of access to objects based on a data definition, in accordance with an example embodiment. Referring first to FIG. 4, building upon the example in FIG. 3, a data definition 400 is created. This data definition describes that application objects 308 run on application server objects 310, which use database objects 312, which run on host objects 314. Likewise, a procedure object 316 act on these objects 308, 310, 312, 314 and writes to log objects 320.

In the lower half of this figure, individual data accesses are depicted. Here, for example, the procedure "db-upg-V2-run1" 400 acts on database "C11_DB" 402, which runs on host "Lin_123" 404, which then writes monitoring data "CPU-lin123-timeseries" 406. The procedure "db-upg-V2-run2" 408 acts on database "C12 DB" 410, which runs on host "Lin 124" 412, which then writes monitoring data "CPU-lin124-timeseries" 414. The procedure "as-upg-V4-run1" 416 acts on application server "C12" 418, which uses database "C12_DB" 410.

FIG. 5 is diagram illustrating an example depicting how data access is derived based on the information in FIG. 4. Specifically, a support team may need access to the procedure "As-upg-V-run1" 416 due to an incident that occurred that is related to this procedure. Granting access to procedure "As-upg-V-run1" 416 may then automatically permit access to linked objects. Thus, for example, a support person gaining access to "As-upg-V-run1" 416 may then automatically get access to application server "C12" 418, database "C12_DB" 410, host "Lin 124" 412, and "CPU-lin124-timeseries" 414.

It should be noted that the automatic permitting of access to linked objects may not be absolute in all cases. In some example embodiments, it may be desirable to limit exactly how much of the linked data a user is able to access, based on the type of data the user is initially able to access. This may be called "2-level linking."

Figure 6:
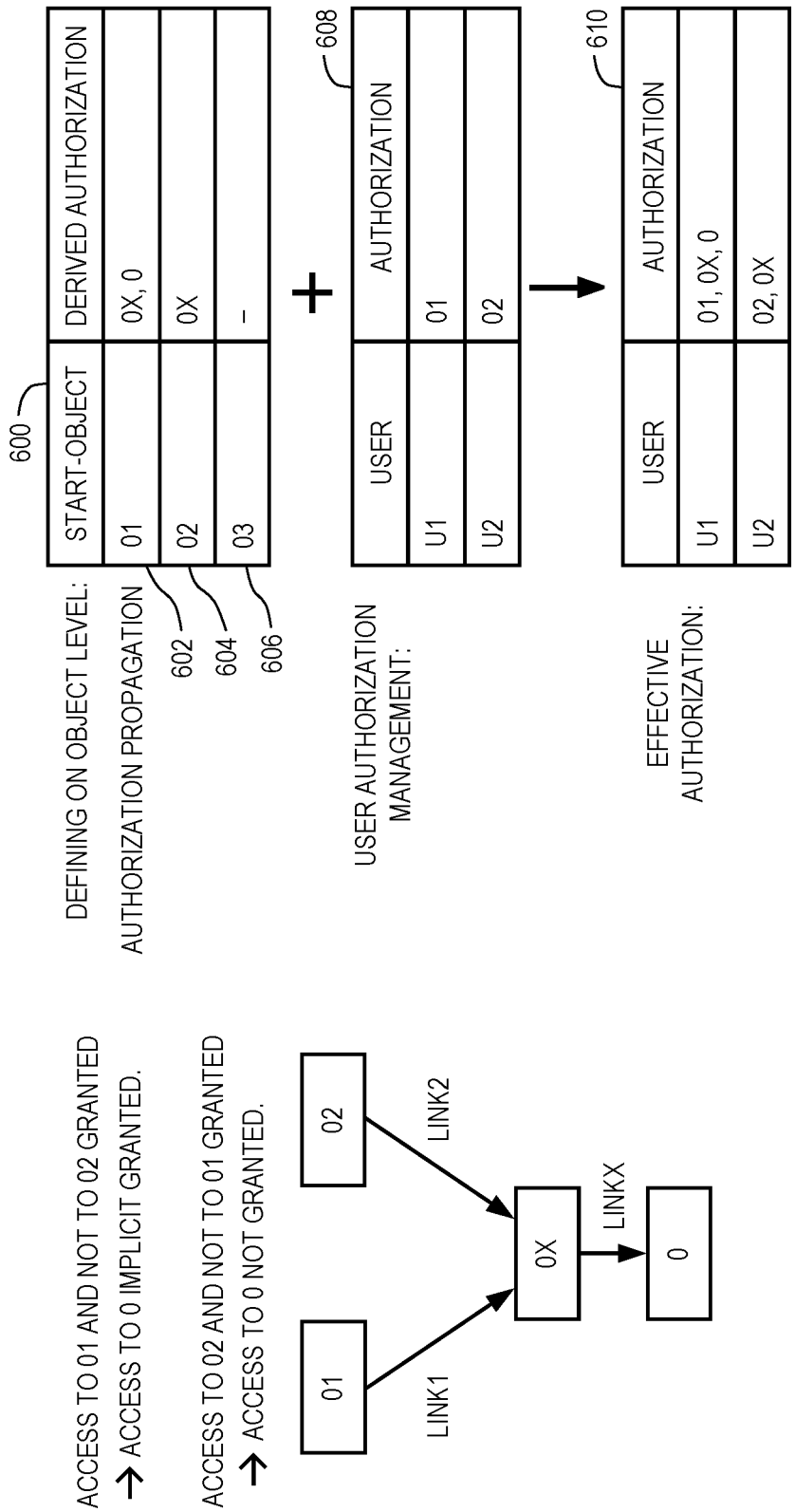
FIG. 6 is a diagram illustrating an example of 2-level linking, in accordance with an example embodiment.

FIG. 6 is a diagram illustrating an example of 2-level linking, in accordance with an example embodiment. Here, definitions 600 may be provided indicating, for each possible object, what linked objects access to the object (as a starting object) derives. Thus, for example, definition 602 here indicates that if a user is granted initial access to object 01, and begins a data access by accessing object 01, the user should also be able to get access to linked objects 0X and 0. The definition 604 here indicates that if a user is granted initial access to object 02, then the user should also be able to get access to linked object 0X, but not access to object 0. This is notable because 0 is linked to from 0X and thus, if pure linkage were used, then the user would be given access to 0 as well.

User authorizations 608 here indicate that, as stated above, user U1 is explicitly granted authorization to object 01 while user U2 is granted authorization to 02. Effective authorizations 610 then indicate how user U1 is additionally granted derived authorization to object 0X and object 0, while user U2 is then additionally granted derived authorization to only object 0X. It should be noted that it is not necessary that these derived authorizations actually be stored anywhere or predetermined prior to a data access. The data lake retrieval engine 122 is able to calculate these derived authorizations on-the-fly at runtime using the source data authorization data 110, data lake domain authorization data 116, and/or data linkage information 120.

Figure 7:
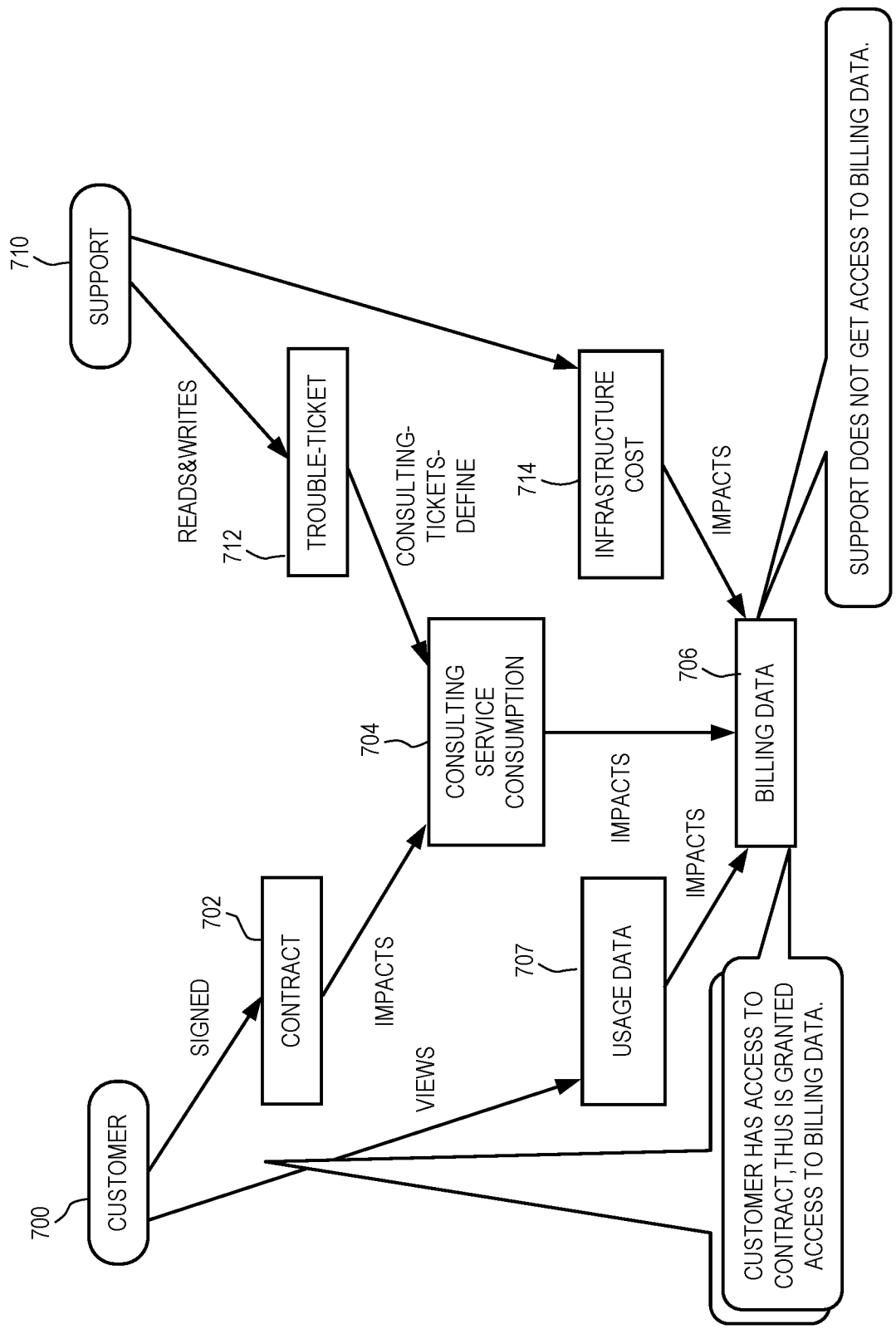
FIG. 7 is a block diagram illustrating 2-level linking applied to an application troubleshooting scenario.

FIG. 7 is a block diagram illustrating 2-level linking applied to an application troubleshooting scenario. Here, customer 700 signed a contract 702, which impacts a consulting service consumption object 704 that impacts billing data 706. The customer also views usage data 707 that impacts the billing data 706. Support person 710 reads and writes a trouble ticket 712 that defines the consulting service consumption object 704, and support person 710 also has access to infrastructure cost information 714 that impacts billing data 706. The 2-level linking authorizations may be set up to define that a user who has access to a contract 702 gets derived authorization to a linked consulting service consumption object 704 and a linked billing data 706, while a user who has access to a trouble ticket 712 gets derived authorization to a linked consulting service consumption object 704 but not to linked billing data 706. This allows, at runtime, customer 700 to get derived access to his or her billing data 706, based on the fact that the customer 700 initially accesses the contract 702, whereas the support person 710 gets derived access to the consulting service consumption object 704 but not to the user's billing data 706. Likewise, the customer 700 gets access to the contract 702 and usage data 706 but not to the infrastructure cost 708.

In an example embodiment, the data lake retrieval engine 122 contains a pipeline where various procedures to compute access on derived information are stored. At run-time, the data lake retrieval engine 122 may access and run the procedures in the pipeline. A variety of different procedures can be defined in this pipeline, including, for example, constraining access to a single object in a set of data domains, constraining access to a single object from a set of data origins, granting access to an entity to all linked entities, granting access to data sets where the access had been granted to the data set in the original system, granting access to linked data where the domain is granted, and granting access to one data point in a data lake.

As described above, in some example embodiments, access to linked data can be granted not only to single records but to ranges. The ranges can even be defined via values of data records of the linked objects. This can be performed using annotations at the associations, with the annotations being evaluated upon access. The association (e.g., link X) can be defined between two data domains (e.g. D1 and D2 can, for example, be tables). The association (X) can then be annotated with fields describing a foreign key relationship to identify single records of the domains related to each other (e.g. D1-A11 relates to D2-A21). Additionally, the association can be annotated by range specification, defining the start- and end-values of the range in the source domain relating to an attribute of the target domain (e.g. the condition is: "D1-A12<=D2-A22<=D1-A13").

Figure 8:
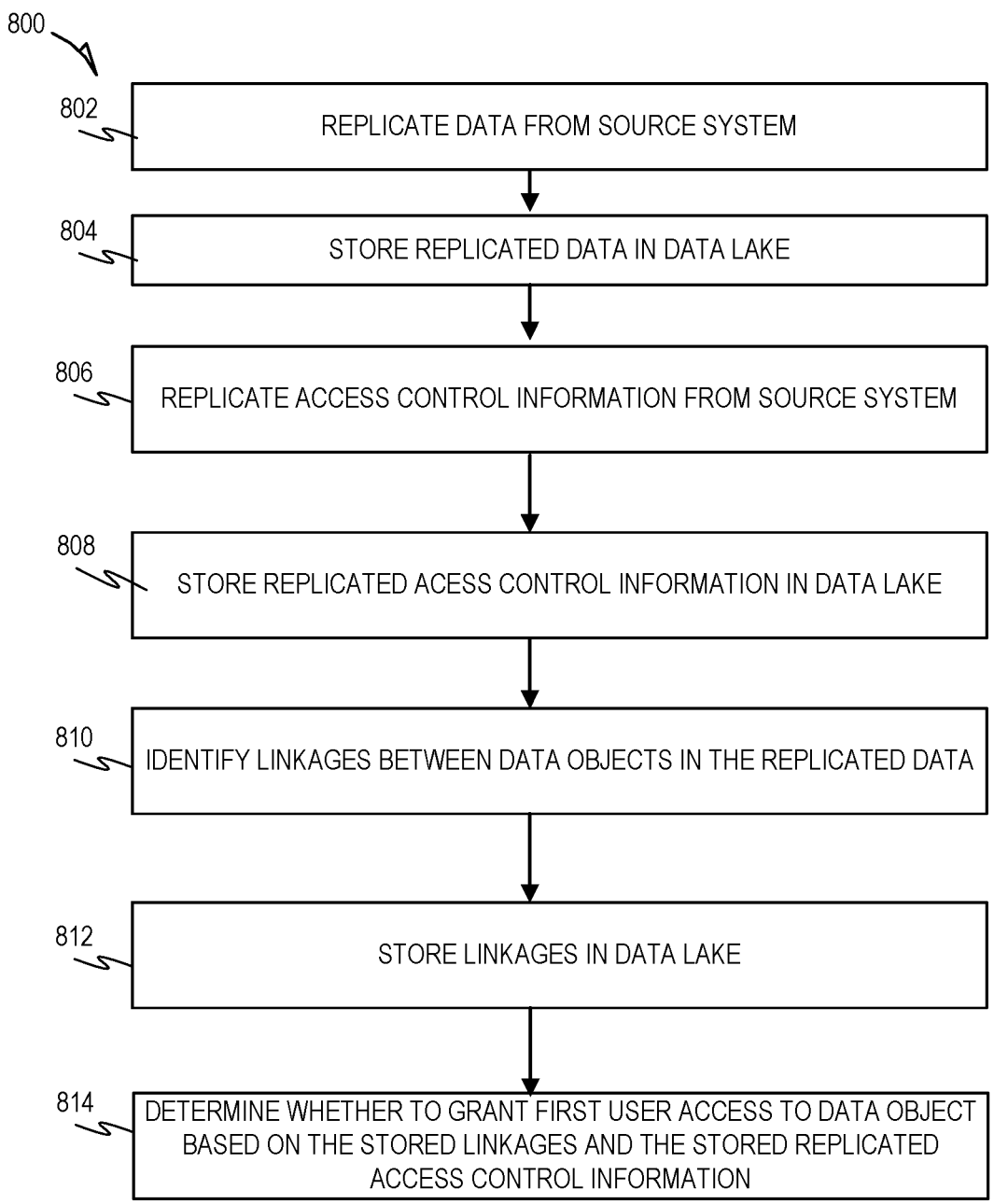
FIG. 8 is a flow diagram illustrating a method 800 for granting access to data objects in a data lake, in accordance with an example embodiment.

FIG. 8 is a flow diagram illustrating a method 800 for granting access to data objects in a data lake, in accordance with an example embodiment. At operation 802, data is replicated from a source system. At operation 804, the replicated data is stored in a data lake. At operation 806, access control information regarding the data is replicated from the source system. At operation 808, the replicated access control information is stored in the data lake. At operation 810, linkages between data objects in the replicated data are identified. At operation 812, the linkages are stored in the data lake. At operation 814, in response to a request from a first user to access a data object in the replicated data in the data lake, it is determined whether to grant access to the data object based on the stored linkages and the stored replicated access control information. In some example embodiments, this determination may also be based on stored access control permissions defining, for a first object type, a set of additional object types to which to automatically grant access if a user has access to an object of the first object type.

EXAMPLES

Example 1. A system comprising:
at least one hardware processor; and
a computer-readable medium storing instructions that, when executed by the at least one hardware processor, cause the at least one hardware processor to perform operations comprising:
  replicating data from a source system;
  storing the replicated data in a data lake;
  replicating access control information regarding the data from the source system;
  storing the replicated access control information in the data lake;
  identifying linkages between data objects in the replicated data;
  storing the linkages in the data lake; and
  in response to a request from a first user to access a data object in the replicated data in the data lake, determining whether to grant access to the data object based on the stored linkages and the stored replicated access control information.

Example 2. The system of Example 1, wherein the operations further comprise:
  storing object-based access control permissions defining, for a first object type, a set of additional object types to which to automatically grant access if a user has access to an object of the first object type; and
  wherein the determining further comprises determining whether to grant access to the data object based on the stored linkages, the stored replicated access control information, and the object-based access control permissions.

Example 3. The system of Example 2, wherein the operations further comprise:
  defining one or more links between objects of different data domains; and
  annotating the one or more links with context information.

Example 4. The system of Example 3, wherein the operations further comprise:
  annotating the one or more links with value ranges on source objects.

Example 5. The system of any of Examples 2-4, wherein the operations further comprise:
  storing object-based access control permissions defining, for a second object type, a set of additional object types to which to automatically grant access if a user has access to an object of the second object type, wherein the set of additional object types include some, but not all, of the additional object types in the set of additional object types to which to automatically grant access if a user has access to an object of the first object type.

Example 6. The system of any of Examples 1-5, wherein the identifying linkages include defining a data definition linking object types.

Example 7. The system of any of Examples 1-6, wherein the identifying linkages includes identifying linkages between data objects of different domains.

Example 8. A method comprising:
  replicating data from a source system;
  storing the replicated data in a data lake;
  replicating access control information regarding the data from the source system;
  storing the replicated access control information in the data lake;
  identifying linkages between data objects in the replicated data;
  storing the linkages in the data lake; and
  in response to a request from a first user to access a data object in the replicated data in the data lake, determining whether to grant access to the data object based on the stored linkages and the stored replicated access control information.

Example 9. The method of Example 8, further comprising:
  storing object-based access control permissions defining, for a first object type, a set of additional object types to which to automatically grant access if a user has access to an object of the first object type; and
  wherein the determining further comprises determining whether to grant access to the data object based on the stored linkages, the stored replicated access control information, and the object-based access control permissions.

Example 10. The method of Example 9, further comprising:
  defining one or more links between objects of different data domains; and
  annotating the one or more links with context information.

Example 11. The method of Example 10, further comprising:
  annotating the one or more links with value ranges on source objects.

Example 12. The method of any of Examples 9-11, further comprising:
  storing object-based access control permissions defining, for a second object type, a set of additional object types to which to automatically grant access if a user has access to an object of the second object type, wherein the set of additional object types include some, but not all, of the additional object types in the set of additional object types to which to automatically grant access if a user has access to an object of the first object type.

Example 13. The method of any of Examples 8-12, wherein the identifying linkages include defining a data definition linking object types.

Example 14. The system of any of Examples 8-13, wherein the identifying linkages includes identifying linkages between data objects of different domains.

Example 15. A non-transitory machine-readable medium storing instructions which, when executed by one or more processors, cause the one or more processors to perform operations comprising:
  replicating data from a source system;
  storing the replicated data in a data lake;
  replicating access control information regarding the data from the source system;
  storing the replicated access control information in the data lake;
  identifying linkages between data objects in the replicated data;
  storing the linkages in the data lake; and
  in response to a request from a first user to access a data object in the replicated data in the data lake, determining whether to grant access to the data object based on the stored linkages and the stored replicated access control information.

Example 16. The non-transitory machine-readable medium of Example 15, wherein the operations further comprise:

storing object-based access control permissions defining, for a first object type, a set of additional object types to which to automatically grant access if a user has access to an object of the first object type; and wherein the determining further comprises determining whether to grant access to the data object based on the stored linkages, the stored replicated access control information, and the object-based access control permissions.

Example 17. The non-transitory machine-readable of Example 16, wherein the operations further comprise:

defining one or more links between objects of different data domains; and annotating the one or more links with context information.

Example 18. The non-transitory machine-readable of Example 17, wherein the operations further comprise:

annotating the one or more links with value ranges on source objects.

Example 19. The non-transitory machine-readable of any of Examples 16-18, wherein the operations further comprise:

storing object-based access control permissions defining, for a second object type, a set of additional object types to which to automatically grant access if a user has access to an object of the second object type, wherein the set of additional object types include some, but not all, of the additional object types in the set of additional object types to which to automatically grant access if a user has access to an object of the first object type.

Example 20. The non-transitory machine-readable of any of Examples 15-19, wherein the identifying linkages include defining a data definition linking object types.

Figure 9:
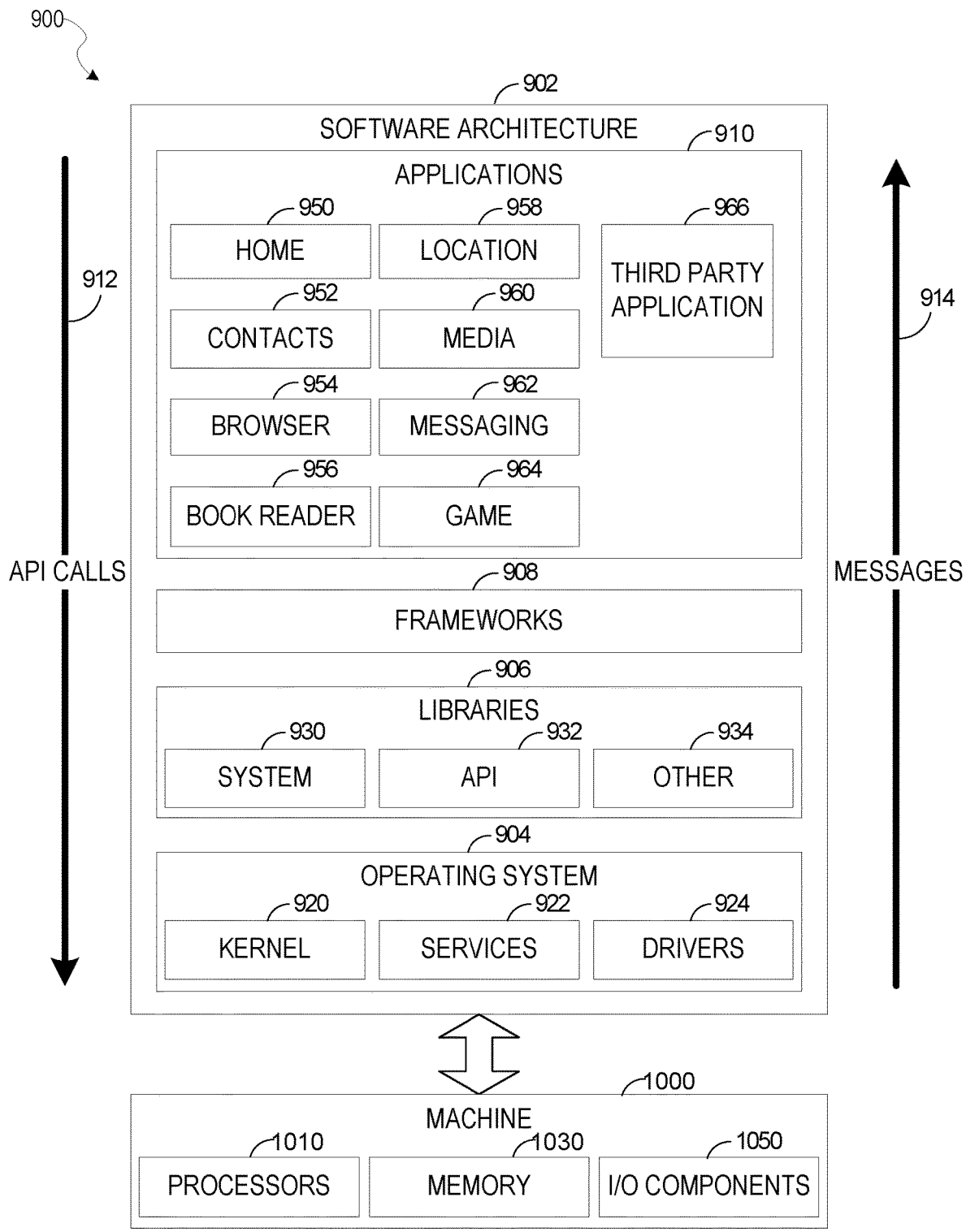
FIG. 9 is a block diagram illustrating an architecture of software, which can be installed on any one or more of the devices described above.

FIG. 9 is a block diagram 900 illustrating an architecture of software 902, which can be installed on any one or more of the devices described above. FIG. 9 is merely a non-limiting example of a software architecture, and it will be appreciated that many other architectures can be implemented to facilitate the functionality described herein. In various embodiments, the software 902 is implemented by hardware such as a machine 1000 of FIG. 10 that includes processors 1010, memory 1030, and input/output (I/O) components 1050. In this example architecture, the software 902 can be conceptualized as a stack of layers where each layer may provide a particular functionality. For example, the software architecture 902 includes layers such as an operating system 904, libraries 906, frameworks 908, and applications 910. Operationally, the applications 910 invoke API calls 912 through the software stack and receive messages 914 in response to the API calls 912, consistent with some embodiments.

In various implementations, the operating system 904 manages hardware resources and provides common services. The operating system 904 includes, for example, a kernel 920, services 922, and drivers 924. The kernel 920 acts as an abstraction layer between the hardware and the other software layers, consistent with some embodiments. For example, the kernel 920 provides memory management, processor management (e.g., scheduling), component management, networking, and security settings, among other functionality. The services 922 can provide other common services for the other software layers. The drivers 924 are responsible for controlling or interfacing with the underlying hardware, according to some embodiments. For instance, the drivers 924 can include display drivers, camera drivers, BLUETOOTH® or BLUETOOTH® Low-Energy drivers, flash memory drivers, serial communication drivers (e.g., Universal Serial Bus (USB) drivers), Wi-Fi® drivers, audio drivers, power management drivers, and so forth.

In some embodiments, the libraries 906 provide a low-level common infrastructure utilized by the applications 910. The libraries 906 can include system libraries 930 (e.g., C standard library) that can provide functions such as memory allocation functions, string manipulation functions, mathematic functions, and the like. In addition, the libraries 906 can include API libraries 932 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in 2D and 3D in a graphic context on a display), database libraries (e.g., SQLite to provide various relational database functions), web libraries (e.g., WebKit to provide web browsing functionality), and the like. The libraries 906 can also include a wide variety of other libraries 934 to provide many other APIs to the applications 910.

The frameworks 908 provide a high-level common infrastructure that can be utilized by the applications 910, according to some embodiments. For example, the frameworks 908 provide various GUI functions, high-level resource management, high-level location services, and so forth. The frameworks 908 can provide a broad spectrum of other APIs that can be utilized by the applications 910, some of which may be specific to a particular operating system 904 or platform.

In an example embodiment, the applications 910 include a home application 950, a contacts application 952, a browser application 954, a book reader application 956, a location application 958, a media application 960, a messaging application 962, a game application 964, and a broad assortment of other applications, such as a third-party application 966. According to some embodiments, the applications 910 are programs that execute functions defined in the programs. Various programming languages can be employed to create one or more of the applications 910, structured in a variety of manners, such as object-oriented programming languages (e.g., Objective-C, Java, or C++) or procedural programming languages (e.g., C or assembly language). In a specific example, the third-party application 966 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 966 can invoke the API calls 912 provided by the operating system 904 to facilitate functionality described herein.

Figure 10:
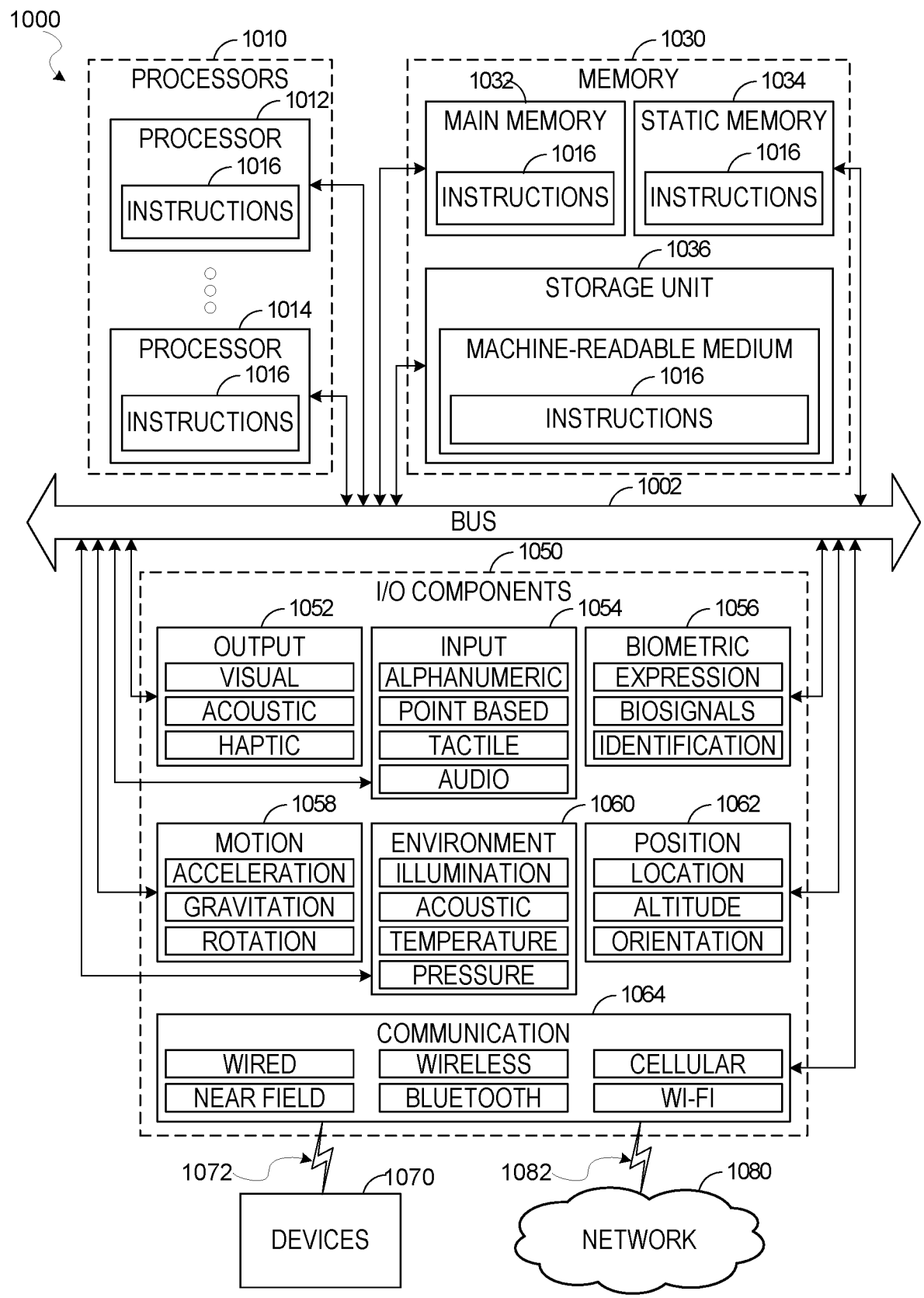
FIG. 10 illustrates a diagrammatic representation of a machine in the form of a computer system within which a set of instructions may be executed for causing the machine to perform any one or more of the methodologies discussed herein, according to an example embodiment.

FIG. 10 illustrates a diagrammatic representation of a machine 1000 in the form of a computer system within which a set of instructions may be executed for causing the machine 1000 to perform any one or more of the methodologies discussed herein, according to an example embodiment. Specifically, FIG. 10 shows a diagrammatic representation of the machine 1000 in the example form of a computer system, within which instructions 1016 (e.g., software, a program, an application, an applet, an app, or other executable code) for causing the machine 1000 to perform any one or more of the methodologies discussed herein may be executed. For example, the instructions 1016 may cause the machine 1000 to execute the method 800 of FIG. 8. Additionally, or alternatively, the instructions 1016 may implement FIGS. 1-8 and so forth. The instructions 1016 transform the general, non-programmed machine 1000 into a particular machine 1000 programmed to carry out the described and illustrated functions in the manner described. In alternative embodiments, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1016, sequentially or otherwise, that specify actions to be taken by the machine 1000. Further, while only a single machine 1000 is illustrated, the term "machine" shall also be taken to include a collection of machines 1000 that individually or jointly execute the instructions 1016 to perform any one or more of the methodologies discussed herein.

The machine 1000 may include processors 1010, memory 1030, and I/O components 1050, which may be configured to communicate with each other such as via a bus 1002. In an example embodiment, the processors 1010 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1012 and a processor 1014 that may execute the instructions 1016. The term "processor" is intended to include multi-core processors that may comprise two or more independent processors (sometimes referred to as "cores") that may execute instructions 1016 contemporaneously. Although FIG. 10 shows multiple processors 1010, the machine 1000 may include a single processor 1012 with a single core, a single processor 1012 with multiple cores (e.g., a multi-core processor 1012), multiple processors 1012, 1014 with a single core, multiple processors 1012, 1014 with multiple cores, or any combination thereof.

The memory 1030 may include a main memory 1032, a static memory 1034, and a storage unit 1036, each accessible to the processors 1010 such as via the bus 1002. The main memory 1032, the static memory 1034, and the storage unit 1036 store the instructions 1016 embodying any one or more of the methodologies or functions described herein. The instructions 1016 may also reside, completely or partially, within the main memory 1032, within the static memory 1034, within the storage unit 1036, within at least one of the processors 1010 (e.g., within the processor's cache memory), or any suitable combination thereof, during execution thereof by the machine 1000.

The I/O components 1050 may include a wide variety of components to receive input, provide output, produce output, transmit information, exchange information, capture measurements, and so on. The specific I/O components 1050 that are included in a particular machine will depend on the type of machine. For example, portable machines such as mobile phones will likely include a touch input device or other such input mechanisms, while a headless server machine will likely not include such a touch input device. It will be appreciated that the I/O components 1050 may include many other components that are not shown in FIG. 10. The I/O components 1050 are grouped according to functionality merely for simplifying the following discussion, and the grouping is in no way limiting. In various example embodiments, the I/O components 1050 may include output components 1052 and input components 1054. The output components 1052 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1054 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1050 may include biometric components 1056, motion components 1058, environmental components 1060, or position components 1062, among a wide array of other components. For example, the biometric components 1056 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1058 may include acceleration sensor components (e.g., accelerometer), gravitation sensor components, rotation sensor components (e.g., gyroscope), and so forth. The environmental components 1060 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1062 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1050 may include communication components 1064 operable to couple the machine 1000 to a network 1080 or devices 1070 via a coupling 1082 and a coupling 1072, respectively. For example, the communication components 1064 may include a network interface component or another suitable device to interface with the network 1080. In further examples, the communication components 1064 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1070 may be another machine or any of a wide variety of peripheral devices (e.g., coupled via a USB).

Moreover, the communication components 1064 may detect identifiers or include components operable to detect identifiers. For example, the communication components 1064 may include radio-frequency identification (RFID) tag reader components, NFC smart tag detection components, optical reader components (e.g., an optical sensor to detect one-dimensional bar codes such as Universal Product Code (UPC) bar code, multi-dimensional bar codes such as QR code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1064, such as location via Internet Protocol (IP) geolocation, location via Wi-Fi® signal triangulation, location via detecting an NFC beacon signal that may indicate a particular location, and so forth.

The various memories (i.e., 1030, 1032, 1034, and/or memory of the processor(s) 1010) and/or the storage unit 1036 may store one or more sets of instructions 1016 and data structures (e.g., software) embodying or utilized by any one or more of the methodologies or functions described herein. These instructions (e.g., the instructions 1016), when executed by the processor(s) 1010, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 1080 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 1080 or a portion of the network 1080 may include a wireless or cellular network, and the coupling 1082 may be a Code Division Multiple Access (CDMA) connection, a Global System for Mobile communications (GSM) connection, or another type of cellular or wireless coupling. In this example, the coupling 1082 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions 1016 may be transmitted or received over the network 1080 using a transmission medium via a network interface device (e.g., a network interface component included in the communication components 1064) and utilizing any one of a number of well-known transfer protocols (e.g., Hypertext Transfer Protocol (HTTP)). Similarly, the instructions 1016 may be transmitted or received using a transmission medium via the coupling 1072 (e.g., a peer-to-peer coupling) to the devices 1070. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1016 for execution by the machine 1000, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system comprising:
   at least one hardware processor; and
   a computer-readable medium storing instructions that, when executed by the at least one hardware processor, cause the at least one hardware processor to perform operations comprising:
   for data replicated from a source system to a data lake, replicating access control information regarding the replicated data;

storing the replicated access control information in the data lake with the replicated data;
identifying linkages between data objects in the replicated data;
storing the linkages in the data lake;
in response to a request from a first user to access a data object, in the replicated data in the data lake, to which the first user has not been granted access in the access control information, determining whether the first user is allowed to access the data object based on the stored linkages; and
in response to a determination that the first user is allowed to access the data object based on the stored linkages, retrieving the data object.

2. The system of claim 1, wherein the operations further comprise:
storing object-based access control permissions defining, for a first object type, a set of additional object types to which to automatically grant access if a user has access to an object of the first object type; and
wherein the determining further comprises determining whether to grant access to the data object based on the stored linkages, the stored replicated access control information, and the object-based access control permissions.

3. The system of claim 1, wherein the determining whether to grant access to the data object is based on whether the first user has been granted access to a data object, stored in the source system, from which the data object in the data lake was replicated.

4. The system of claim 1, wherein the determining whether to grant access to the data object is based on whether the data object is linked in the linkages to another data object to which the first user has been granted access in the access control information.

5. The system of claim 1, wherein the determining whether to grant access to the data object is based on whether one or more values in one or more fields of the data object are within one or more ranges.

6. The system of claim 5, wherein the determining whether to grant access to the data object is further based on values in records of data objects identified in the linkages.

7. The system of claim 1, wherein the identifying linkages includes identifying linkages between data objects of different domains.

8. A method comprising:
for data replicated from a source system to a data lake, replicating access control information regarding the replicated data;
storing the replicated access control information in the data lake with the replicated data;
identifying linkages between data objects in the replicated data;
storing the linkages in the data lake;
in response to a request from a first user to access a data object, in the replicated data in the data lake, to which the first user has not been granted access in the access control information, determining whether the first user is allowed to access the data object based on the stored linkages; and
in response to a determination that the first user is allowed to access the data object based on the stored linkages, retrieving the data object.

9. The method of claim 8, further comprising:
storing object-based access control permissions defining, for a first object type, a set of additional object types to which to automatically grant access if a user has access to an object of the first object type; and
wherein the determining further comprises determining whether to grant access to the data object based on the stored linkages, the stored replicated access control information, and the object-based access control permissions.

10. The method of claim 8, wherein the determining whether to grant access to the data object is based on whether the first user has been granted access to a data object, stored in the source system, from which the data object in the data lake was replicated.

11. The method of claim 8, wherein the determining whether to grant access to the data object is based on whether the data object is linked in the linkages to another data object to which the first user has been granted access.

12. The method of claim 8, wherein the determining whether to grant access to the data object is based on whether one or more values in one or more fields of the data object are within one or more ranges.

13. The method of claim 12, wherein the determining whether to grant access to the data object is further based on values in records of data objects identified in the linkages.

14. The method of claim 8, wherein the identifying linkages includes identifying linkages between data objects of different domains.

15. A non-transitory machine-readable medium storing instructions which, when executed by one or more processors, cause the one or more processors to perform operations comprising:
for data replicated from a source system to a data lake, replicating access control information regarding the replicated data;
storing the replicated access control information in the data lake with the replicated data;
identifying linkages between data objects in the replicated data;
storing the linkages in the data lake;
in response to a request from a first user to access a data object, in the replicated data in the data lake, to which the first user has not been granted access in the access control information, determining whether the first user is allowed to access the data object based on the stored linkages; and
in response to a determination that the first user is allowed to access the data object based on the stored linkages, retrieving the data object.

16. The non-transitory machine-readable medium of claim 15, wherein the operations further comprise:
storing object-based access control permissions defining, for a first object type, a set of additional object types to which to automatically grant access if a user has access to an object of the first object type; and
wherein the determining further comprises determining whether to grant access to the data object based on the stored linkages, the stored replicated access control information, and the object-based access control permissions.

17. The non-transitory machine-readable medium of claim 15, wherein the determining whether to grant access to the data object is based on whether the first user has been granted access to a data object, stored in the source system, from which the data object in the data lake was replicated.

18. The non-transitory machine-readable medium of claim 15, wherein the determining whether to grant access to the data object is based on whether the data object is linked in the linkages to another data object to which the first user has been granted access.

19. The non-transitory machine-readable medium of claim 15, wherein the determining whether to grant access to the data object is based on whether one or more values in one or more fields of the data object are within one or more ranges.

20. The non-transitory machine-readable medium of claim 19, wherein the determining whether to grant access to the data object is further based on values in records of data objects identified in the linkages.

* * * * *